United States Patent
Adzic et al.

(10) Patent No.: US 9,099,253 B2
(45) Date of Patent: Aug. 4, 2015

(54) ELECTROCHEMICAL SYNTHESIS OF ELONGATED NOBLE METAL NANOPARTICLES, SUCH AS NANOWIRES AND NANORODS, ON HIGH-SURFACE AREA CARBON SUPPORTS

(71) Applicant: Brookhaven Science Associates, LLC/Brookhaven National Laboratory, Upton, NY (US)

(72) Inventors: Radoslav Adzic, Setauket, NY (US); Stoyan Blyznakov, South Setauket, NY (US); Miomir Vukmirovic, Port Jefferson Station, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 165 days.

(21) Appl. No.: 13/624,149

(22) Filed: Sep. 21, 2012

(65) Prior Publication Data
US 2013/0034803 A1 Feb. 7, 2013

Related U.S. Application Data

(63) Continuation-in-part of application No. 12/603,216, filed on Oct. 21, 2009, now Pat. No. 8,699,207, and a continuation-in-part of application No. PCT/US2011/043901, filed on Jul. 13, 2011.

(Continued)

(51) Int. Cl.
*H01G 11/46* (2013.01)
*H01M 4/86* (2006.01)
(Continued)

(52) U.S. Cl.
CPC .............. *H01G 11/46* (2013.01); *B82Y 30/00* (2013.01); *B82Y 40/00* (2013.01); *H01G 11/36* (2013.01);

(Continued)

(58) Field of Classification Search
CPC .......... H01M 4/92; H01G 9/042; B01J 31/28; B01J 31/26; H01B 5/00; B82Y 4/00
See application file for complete search history.

(56) References Cited

U.S. PATENT DOCUMENTS 7,691,780 B2 * 4/2010 Adzic et al. ............... 502/339
2005/0230270 A1 10/2005 Ren et al.
(Continued)

FOREIGN PATENT DOCUMENTS

WO   WO 2012/009467 A1   1/2012

OTHER PUBLICATIONS

Chen et al.; Pulsed Electrodeposition of Pt Nanoclusters on Carbon Nanotubes Modified Carbon Materials using Diffusion Restricting Viscous Electrolytes; Electrochemistry Communications; 9, pp. 1348-1354; 2007.*

(Continued)

*Primary Examiner* — Guinever Gregorio
(74) *Attorney, Agent, or Firm* — Dorene M. Price; Lars O. Husebo

(57) ABSTRACT

Elongated noble-metal nanoparticles and methods for their manufacture are disclosed. The method involves the formation of a plurality of elongated noble-metal nanoparticles by electrochemical deposition of the noble metal on a high surface area carbon support, such as carbon nanoparticles. Prior to electrochemical deposition, the carbon support may be functionalized by oxidation, thus making the manufacturing process simple and cost-effective. The generated elongated nanoparticles are covalently bound to the carbon support and can be used directly in electrocatalysis. The process provides elongated noble-metal nanoparticles with high catalytic activities and improved durability in combination with high catalyst utilization since the nanoparticles are deposited and covalently bound to the carbon support in their final position and will not change in forming an electrode assembly.

21 Claims, 5 Drawing Sheets

Related U.S. Application Data

(60) Provisional application No. 61/537,814, filed on Sep. 22, 2011, provisional application No. 61/107,048, filed on Oct. 21, 2008, provisional application No. 61/364,040, filed on Jul. 14, 2010.

(51) Int. Cl.
  *B82Y 30/00* (2011.01)
  *B82Y 40/00* (2011.01)
  *H01G 11/36* (2013.01)
  *H01M 4/92* (2006.01)

(52) U.S. Cl.
  CPC ............ *H01M 4/8657* (2013.01); *H01M 4/926* (2013.01); *Y02E 60/13* (2013.01); *Y02E 60/50* (2013.01)

(56) References Cited

U.S. PATENT DOCUMENTS

| | | | |
|---|---|---|---|
| 2006/0177660 A1* | 8/2006 | Kumar et al. | 428/403 |
| 2009/0038820 A1 | 2/2009 | Keefer | |
| 2010/0177462 A1 | 7/2010 | Adzic et al. | |
| 2010/0197490 A1* | 8/2010 | Adzic et al. | 502/326 |
| 2012/0010069 A1* | 1/2012 | Takehiro et al. | 502/5 |
| 2012/0267605 A1* | 10/2012 | Zhang et al. | 257/12 |

OTHER PUBLICATIONS

Guo et al.; Electrochemical Synthesis of Pd Nanoparticles on Functional MWNT Surfaces; Electrochemistry Communications; 6, 999-1003; 2004.*

International Search Report of International Application PCT/US2012/56643—Date of Completion of Search: Dec. 12, 2012, 4 pages.

Koenigsmann, C., et al., "Enhanced Electrocatalytic Performance of Processed, Ultrathin, Supported Pd-Pt Core-Shell Nanowire Catalysts for the Oxygen Reduction Reaction," *Journal of the American Chemical Society*, vol. 133, pp. 9783 to 9795, (2011).

Chen, X., et al., "Pulsed electrodeposition of Pt nanoclusters on carbon nanotubes modified carbon materials using diffusion restricting viscous electrolytes," *Electrochemistry Communications*, vol. 9, pp. 1348 to 1354, (2007).

Guo, D., et al., "Electrochemical synthesis of Pd nanoparticles on functional MWNT surfaces," *Electrochemistry Communications*, vol. 6, pp. 999 to 1003, (2004).

\* cited by examiner

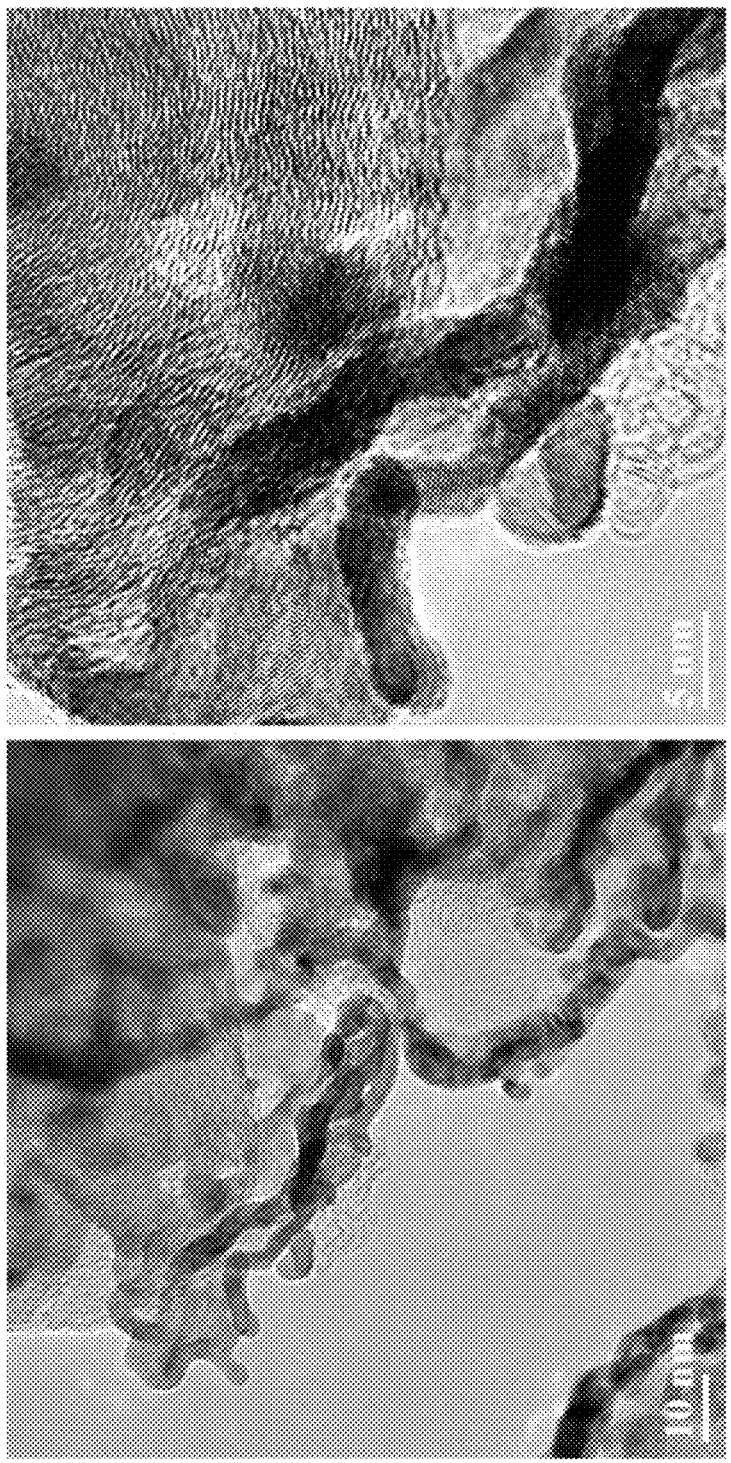

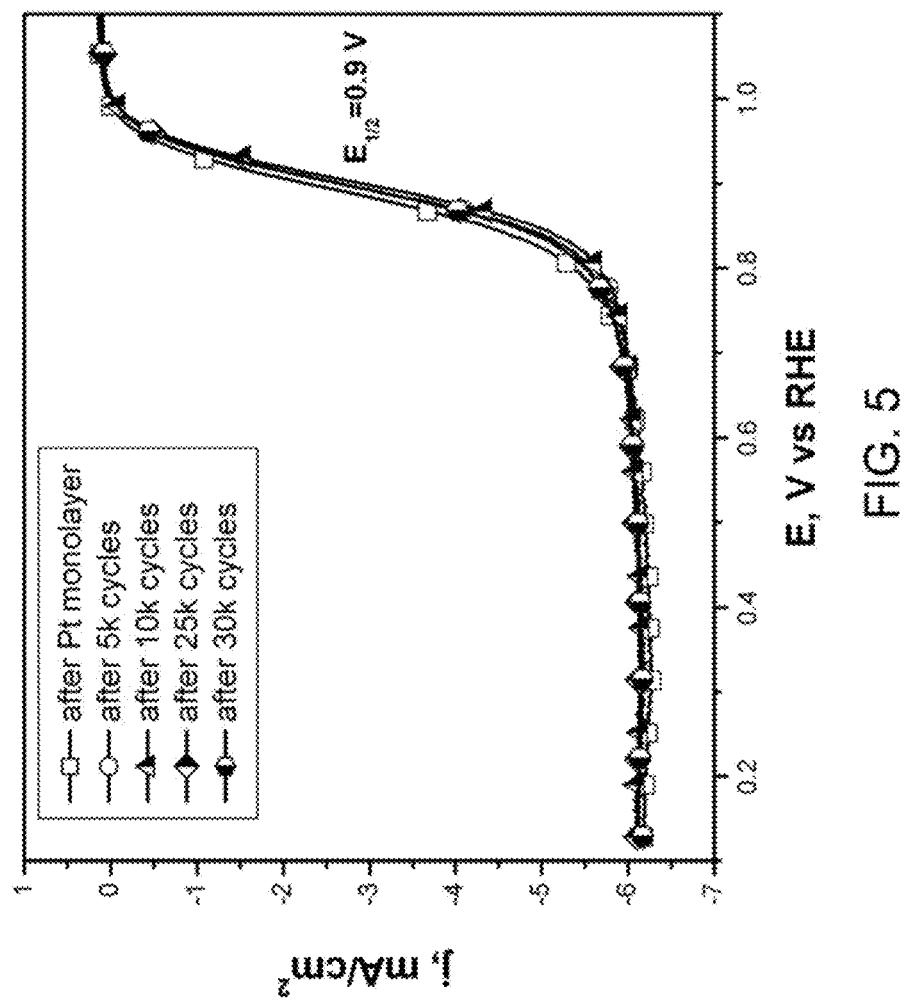

ELECTROCHEMICAL SYNTHESIS OF ELONGATED NOBLE METAL NANOPARTICLES, SUCH AS NANOWIRES AND NANORODS, ON HIGH-SURFACE AREA CARBON SUPPORTS

CROSS-REFERENCE TO A RELATED APPLICATION

This application is a Continuation-In-Part (CIP) of the U.S. patent application Ser. No. 12/603,216, which claims the benefit under 35 U.S.C. §119(e) of U.S. Provisional Application No. 61/107,048 filed Oct. 21, 2008, and the PCT Patent Application No. PCT/US2011/43901, which claims the benefit under 35 U.S.C. 119(e) of U.S. Provisional Application No. 61/364,040 filed on Jul. 14, 2010, the content of which is incorporated herein in their entirety. This application also claims the benefit under 35 U.S.C. §119(e) of U.S. Provisional Application No. 61/537,814 filed Sep. 22, 2011, the content of all above-referenced applications is incorporated herein in its entirety.

STATEMENT OF GOVERNMENT RIGHTS

The present invention was made with government support under contract number DE-ACO2-98CH10886 awarded by the U.S. Department of Energy. The United States government has certain rights in the invention.

FIELD OF THE INVENTION

This invention relates generally to nanoparticles and methods for their manufacture. In particular, the present invention relates to nanometer-scale particles produced by electrochemical deposition on high-surface carbon nanoparticles. The invention also relates to continuous and nonporous core-shell electrocatalysts for the $O_2$ reduction reaction. The invention also relates to the incorporation of such nanoparticles in energy conversion devices.

BACKGROUND

Metals such as platinum (Pt), palladium (Pd), ruthenium (Ru), and related alloys are known to be excellent catalysts. When incorporated in electrodes of an electrochemical device such as a fuel cell, these materials function as electrocatalysts since they accelerate electrochemical reactions at electrode surfaces yet are not themselves consumed by the overall reaction. Although noble metals have been shown to be some of the best electrocatalysts, their successful implementation in commercially available energy conversion devices is hindered by their high cost and scarcity in combination with other factors such as a susceptibility to carbon monoxide (CO) poisoning, poor stability under cyclic loading, and the relatively slow kinetics of the oxygen reduction reaction (ORR).

A variety of approaches has been employed in attempting to address these issues. One well-known approach involves increasing the overall surface area available for reaction by forming metal particles with nanometer-scale dimensions. Loading of more expensive noble metals such as Pt has been further reduced by forming nanoparticles from alloys comprised of Pt and a low-cost component. Still further improvements have been attained by forming core-shell nanoparticles in which a core particle is coated with a shell of a different material which functions as the electrocatalyst. The core is usually a low-cost material which is easily fabricated whereas the shell comprises a more catalytically active noble metal. An example is provided by U.S. Pat. No. 6,670,301 to Adzic, et al. which discloses a process for depositing a thin film of Pt on dispersed Ru nanoparticles supported by carbon (C) substrates. Another example is U.S. Pat. No. 7,691,780 to Adzic, et al. which discloses platinum- and platinum alloy-coated palladium and palladium alloy nanoparticles. Each of the aforementioned U.S. Patents is incorporated by reference in its entirety as if fully set forth in this specification.

One approach for synthesizing core-shell particles with reduced noble metal loading and enhanced activity levels involves the use of electrochemical routes which provide atomic-level control over the formation of uniform and conformal ultrathin coatings of the desired material on a large number of three-dimensional nanoparticles. One such method involves the initial deposition of an atomic monolayer of a metal such as copper (Cu) onto a plurality of nanoparticles by underpotential deposition (UPD). This is followed by galvanic displacement of the underlying Cu atoms by a more noble metal such as Pt as disclosed, for example, in U.S. Pat. No. 7,704,918 to Adzic, et al. Another method involves hydrogen adsorption-induced deposition of a monolayer of metal atoms on noble metal particles as described, for example, by U.S. Pat. No. 7,507,495 to Wang, et al. Each of the aforementioned U.S. Patents is incorporated by reference in its entirety as if fully set forth in this specification.

Although each of these approaches has been successful in providing catalysts with a higher catalytic activity and reduced noble metal loading, still further improvements in both the durability and mass-specific catalytic activity are needed for electrochemical energy conversion devices to become reliable and cost-effective alternatives to conventional fossil fuel-based devices.

One issue relating to the manufacture of conventional single nanoparticles or core-shell nanoparticles is the formation of MOH species on the surface of these nanoparticles that inhibit oxygen reduction reaction (ORR). A large number of low-coordination atoms on the surface of the nanoparticles is particularly prone to such oxidation and to gradual dissolution of the electrocatalyst over time. With continued operation, this tends to reduce the catalytic activity of the electrocatalyst and cause damage to the electrolyte membranes contained within a typical energy conversion device, thereby reducing its charge storage and energy conversion capabilities. One approach for synthesizing nanoparticles with a smaller number of low coordination sites and higher specific activity for the $O_2$ reduction reaction is to synthesize nanowires and nanorods, which tend to have smoother surfaces. However, the conventional synthesis methods tend to use capping agents and surfactants to prevent agglomeration and facilitate growth of the desired shape and take hours or days to complete. An exemplary process is provided in Song et al. (*Nano Letters*, 2007, 7(12), 3650), which is incorporated herein by reference in its entirety. Unfortunately, removing these surfactants is quite difficult and inevitably causes increase of the particles' thickness, breaking of the nanowires, and an increase of the number of low coordination atoms.

There is therefore a continuing need to develop manufacturing methods that would avoid the use of capping agents and surfactants and can be completed within minutes, necessary for large-scale and cost-effective processes suitable for commercial production and incorporation in conventional energy production devices.

SUMMARY

In view of the above-described problems, needs, and goals, the inventors have devised embodiments of the present invention in which methods for anisotropic growth of elongated noble-metal nanoparticles, preferably palladium (Pd) nanowires and nanorods, are provided. The disclosed method is directed to the formation of the elongated nanoparticles by electrochemical deposition of metal on functionalized high surface area carbon supports. Preferably, the high surface area carbon support comprises carbon nanoparticles that can be functionalized by oxidation. The nanoparticles produced by this method can be directly used in electrocatalysis or can be covered by a thin shell layer over the outer surface of the nanoparticle cores. The manufacturing process is simple and cost-effective taking minutes in comparison with hours or days in chemical routes without the use of any capping agents or surfactants, which would require additional steps to remove. The process also provides nanoparticles with high catalytic activities and improved durability in combination with high catalyst utilization since the nanoparticles are deposited in their final position and will not change in forming a membrane electrode assembly.

The nanoparticles may be comprised of a single noble metal, but may comprise a plurality of metal elements or components selected from noble metals. When more than one noble metal is used, the nanoparticle alloy is preferably a homogeneous solid solution, but it may also have compositional nonuniformities. The noble metal preferably includes at least one of palladium (Pd), iridium (Ir), rhenium (Re), ruthenium (Ru), rhodium (Rh), osmium (Os), gold (Au), and platinum (Pt), either alone or as an alloy. The preferred metal used to generate nanowires or nanorods in the disclosed method is palladium (Pd). However, if the disclosed method is used to prepare core-shell nanoparticles, the preferred metal used for the core is palladium (Pd) and the preferred metal used for the shell is platinum (Pt). The nanoparticles that form a core and a more noble metal shell are described in, for example, U.S. Pat. No. 7,704,918 to Adzic, et al. and U.S. Pat. No. 7,507,495 to Wang, et al., which are incorporated herein by reference each in its entirety as if fully set forth in this specification.

In a preferred embodiment, the nanoparticles are formed on a carbon support, preferably high surface area carbon such as carbon nanoparticles, by a process which involves (i) functionalizing the carbon support to generate functional groups on the surface of the carbon support, (ii) forming a thin film of the functionalized carbon support on an electrode, (iii) preparing a pH-buffered solution containing a salt of a metal, (iv) immersing the electrode in the pH-buffered solution, (v) applying a first potential pulse to reduce the metal and nucleate metal nanoparticles on surfaces of the functionalized carbon support, and (vi) applying a second potential pulse to increase the size of the nucleated metal nanoparticles.

The density of nanoparticles is largely determined by the initial nucleation rate that increases with making the potential more negative. Hence, the first potential is typically used to control the density of nanoparticles and is often much lower than an equilibrium potential of the metal or the onset deposition potential for the metal ions in the solution. However, it was discovered that the nucleation density can also be increased by functionalizing the carbon support, for instance by oxidation. The process generates carboxylic, carbonyl, phenol, or lactone functional groups that interact with metal salt molecules during nucleation. Without being bound by theory, it is believed that this interaction allows for the metal salt molecules to be adsorbed more strongly and in greater amounts than on the non-functionalized carbon support.

In a particularly preferred embodiment, the functionalized high surface area support comprises carbon black nanoparticles, e.g., Vulcan® XC-72R (Cabot Corp., Boston, Mass.). The carbon black is preferably functionalized by treating carbon black with an oxidizing agent such as concentrated nitric acid under ambient conditions for 1 to 20 hours. The functionalized carbon black is subsequently purified and deposited in a thin layer or film on the surface of an electrode. The electrode is preferably a rotating disc electrode (RDE) that is rotated at constant rotational rate of 1000 to 2000 rpm, with about 1600 rpm being preferred. The solution for electrodeposition may comprise 0.05 mM to 50 mM $PdCl_2$ or $Pd(NH_3)_4Cl_2$ and 0.1 M NaCl while the first potential is between −0.4 V and −0.3 V and the second potential is between −0.1 V and −0.25 V versus a Ag/AgCl (3 M NaCl) reference electrode. However, it is also envisioned that the first potential may be the same as the second potential, although both potentials are lower than the equilibrium potential of the metal.

The elongated nanoparticles produced following the disclosed method either by themselves or as part of core-shell nanoparticles are particularly advantageous when incorporated into one or more electrodes of an energy conversion device. The structure of such a device comprises at least a first electrode, a conducting electrolyte, and a second electrode. At least one of the first or second electrodes comprises metal nanoparticles preferably made from Pd nanorods or nanowires, or core-shell nanostructures preferably made from a Pd core having a nanorod or nanowire morphology and a continuous and nonporous shell made from Pt. In a preferred embodiment, the nanoparticles incorporated into an energy conversion device have an external diameter of 3 nm to 9 nm.

The production of nanoparticles directly on the functionalized high surface area support therefore permits deposition of nanoparticles at their final position on the electrode surface that will not change in forming the membrane electrode assembly, thereby maximizing the available catalytically active surface area and improving stability. The use of the disclosed method facilitates a more efficient, expedient, and cost-effective process for producing catalytic electrodes for electrochemical energy conversion in devices such as fuel cells and metal-air batteries.

BRIEF DESCRIPTION OF THE DRAWINGS

FIG. 4A is a TEM image of the nanowires prepared on carbon nanoparticles.

FIG. 4B is a TEM image of the nanowires prepared on carbon nanoparticles.

FIG. 5 is a plot showing polarization curves for the oxygen reduction reaction (ORR) on Pt monolayer-coated Pd nanowires.

DETAILED DESCRIPTION

Figure 1:
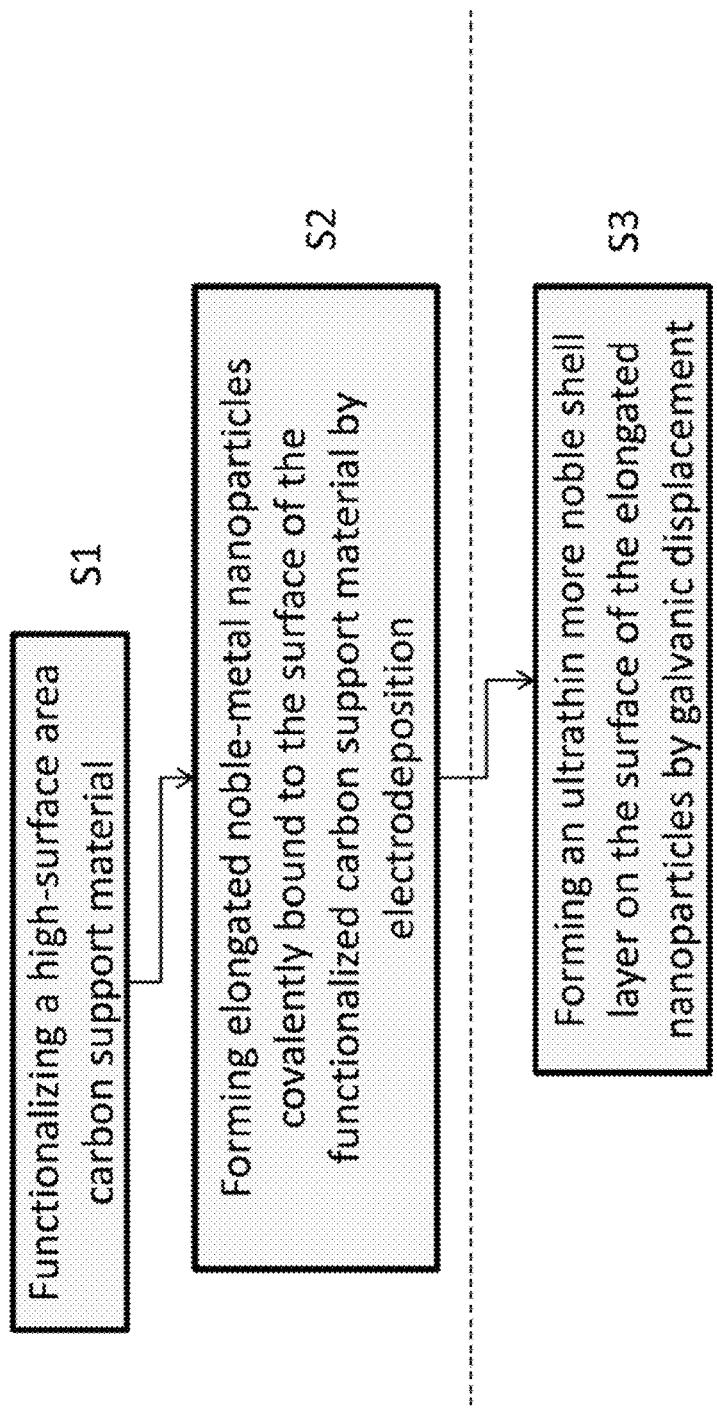
FIG. 1 is a flowchart showing the sequence of steps followed in a generalized method of forming electrocatalytic nanoparticles on the high-surface area support with exposed functionalized groups according to the present invention.

The generalized process for forming elongated nanoparticles according to the disclosed method is described by the flowchart shown in FIG. 1. The method not only provides a deposition process that takes minutes in comparison with hours or days in comparable chemical routes, but also does not require the use of capping agents, surfactants, or other organic compounds to facilitate a heightened catalytic activity. Surfactants have generally been used to control the particle size and to attain a higher particle yield. However, the inclusion of an organic material during particle synthesis significantly lowers the catalytic activity of the particles. Removal of the organic material using Prior Art techniques requires the use of additional washing and/or heating processes which increase both the number of processing steps and the overall cost. Furthermore, even with the appropriate cleaning steps, a residual organic layer typically remains on the surfaces of the nanoparticles. Finally, the nanoparticles can be deposited at the desired position on the electrode that will not change in forming the membrane electrode assembly, thus allowing the most efficient utilization of the catalyst.

As illustrated in FIG. 1, the process involves the initial production of functionalized support material in step S1, preferably by oxidizing carbon nanoparticles. This is followed by formation of elongated nanoparticles of a first material M1 by electrodeposition in step S2. Preferably M1 is Pd, although other noble metals can be successfully used, such as iridium (Ir), rhenium (Re), ruthenium (Ru), rhodium (Rh), osmium (Os), gold (Au), and platinum (Pt), either alone or as an alloy. The morphology of the generated structure is preferably a nanowire or a nanorod; although it could also be a nanosheet, a nanotube, or a nanocone. At this stage of the process, the generated nanostructures can be used for electrocatalysis or as a nanoparticle core in generation of a core-shell nanostructure. For core-shell nanostructures, step S2 is followed by the formation of an ultrathin film of a second material M2 onto the surfaces of the nanoparticle cores in step S3. Thus, the process can generate two distinct types of nanoparticles: (1) elongated nanoparticles made from M1 and (2) elongated core-shell nanoparticles made from M1/M2.

The particular methods used to form the functionalized support material having a high surface area in step S1, the metal nanoparticles on the surface of the functionalized support by electrodeposition in step S2, and the core-shell nanoparticles by displacement in step S3 are not intended to be limited to any particular process without deviating from the spirit and scope of the present invention. Rather, each of the aforementioned steps may be accomplished using any of several processes which are well-known in the art. For example, steps S2 and S3 have been disclosed in PCT Pat. App. No. PCT/US2011/43901, which is incorporated herein by reference in its entirety. Throughout this specification, the nanoparticles and processes for their manufacture will be described using one or more noble metals due to the advantages provided by their use as electrocatalysts and/or catalysts in general.

I. Nanoparticle Synthesis on Functionalized Support

Figure 2:
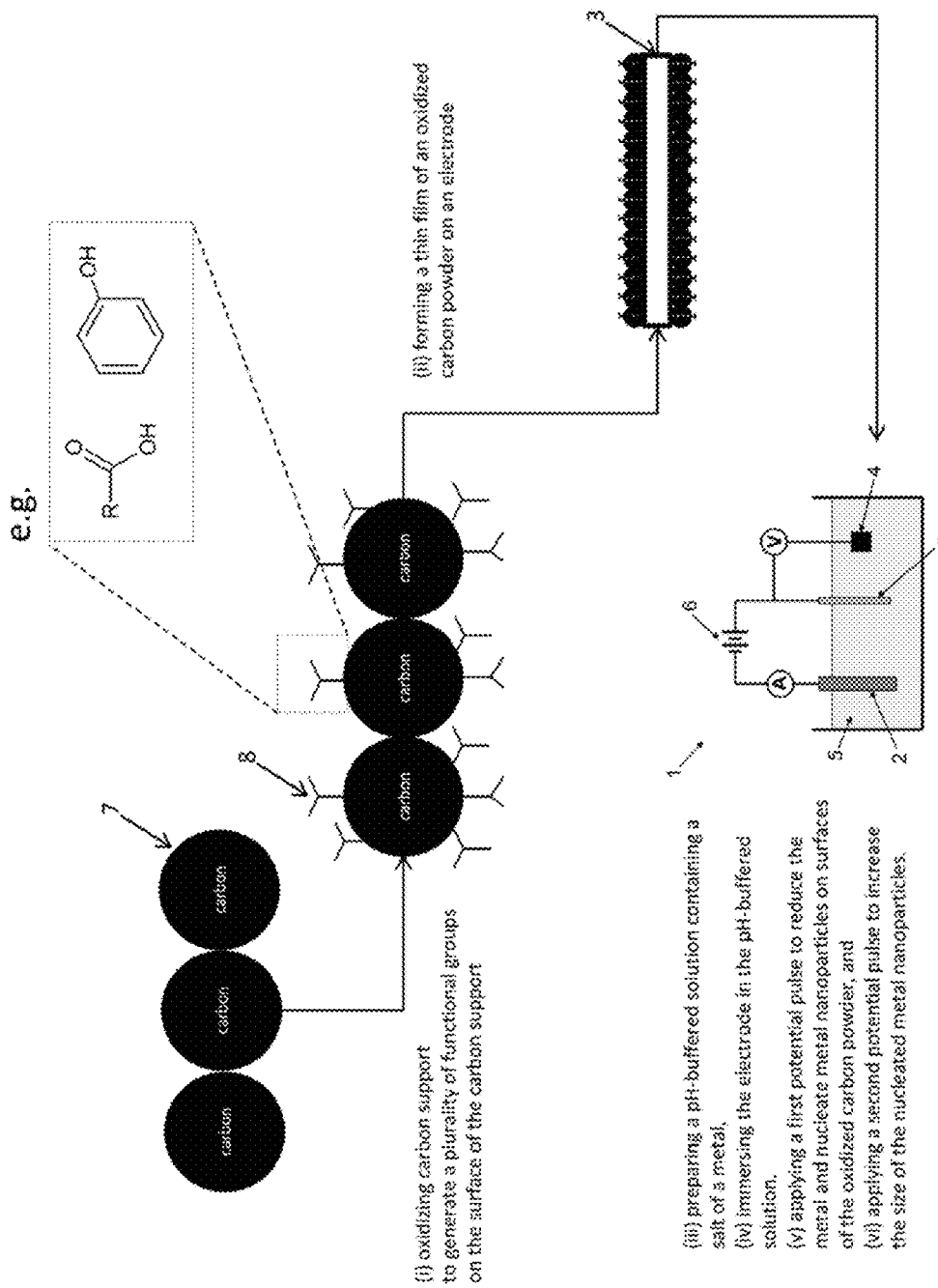
FIG. 2 is a flowchart showing the sequence of steps followed in an exemplary method of forming electrocatalytic nanoparticles on the carbon nanoparticles functionalized by oxidation according to the present invention.

Initially a support having suitable surface area, preferably made from carbon, is treated by any technique which is well-known in the art to generate a plurality of surface-bound functional groups. The support may comprise, but is not limited to, solid carbon nanoparticles, porous macro-scale carbon powder, porous carbon nanoparticles, carbon nanotubes, carbon paper, carbon cloth, reticulated glassy carbon, and graphene. In a preferred embodiment as illustrated in FIG. 2, if the support (7) comprises carbon-based nanoparticles, it may be functionalized by oxidation in a strong acid for 1-20 hours under ambient temperature and pressure to generate surface exposed functional groups (8). The functional groups may include carboxylic (R—COOH), carbonyl (RC=OR), phenol (Ph-OH), lactone (ROC=OR), and a combination of two or more these functional groups. In preferred embodiment, at least 30% of the support material (7) surface is functionalized. In the more preferred embodiment, at least 50% of the support material (7) surface is functionalized. In the most preferred embodiment, at least 70% of the support material (7) surface is functionalized. The duration of oxidation by acid treatment may be adjusted to attain the desired functionalization coverage and distribution, e.g., 1 hour, 2 hours, ... 19 hours, 20 hours, and anything therebetween. The acid used for carbon material oxidation may include, but is not limited to, about 5-70% nitric acid, 5-95% sulfuric acid, as well as perchloric and phosphoric acids.

It is to be understood, however, that the invention is not limited to the generation of functional groups on the surface of the support material by acid-dependent oxidization and may include other approaches well-known in the art as long as these approaches produce a large coverage of functional groups on the surface of the support material. It is also to be understood that the invention is not limited to carbon and may include other support materials or combinations of materials which are well-known in the art as long as these materials can produce functional groups on their surface. The support may be comprised of a single element or material or, in an alternate embodiment, it may be a composition of materials. The support preferably has a high surface area per unit mass, which may be attributed to its size.

Preferably, the support is a powder of carbon nanoparticles, although the support may also include carbon nanotubes, carbon paper, porous macro-scale carbon powder, porous carbon nanoparticles, carbon cloth, reticulated glassy carbon, and graphene. Carbon black sold under the trade name Vulcan® and available from Cabot Corp. (Boston, Mass.), and in particular Vulcan® XC-72R, is one example of a suitable powder of carbon nanoparticles. However, such high surface area support is not limited to homogeneous solid carbon, but may also have added surface porosity, e.g., Vulcan® P. Suitable carbon powder supports are preferably spherical or spheroidal with a size ranging from 2 nm to 100 nm along at least one of three orthogonal dimensions, and are thus nanometer-scale particles. It is to be understood, however, that the particles may take on any shape, size, or structures which include, but are not limited to, branching, conical, pyramidal, cubical, cylindrical, mesh, fiber, cuboctahedral, icosahedral, and tubular nanometer-scale particles. The carbon support particles may be agglomerated or dispersed, formed into ordered arrays, fabricated into an interconnected mesh structure, either formed on a supporting medium or suspended in a solution, and may have even or uneven size distributions. The particle shape and size is preferably configured to maximize surface functionalization activity, for example, by oxidation. In a preferred embodiment the nanoparticle cores have external dimensions of less than 100 nm along at least one of three orthogonal directions. Throughout this specification, the carbon support particles will be primarily disclosed and described as particles which are substantially spherical in shape.

Once the functionalized high surface area support material is prepared, the elongated solid nanoparticles or nanoparticle cores are formed, preferably via a covalent bond, on their surface by pulse electrodeposition. This method involves initially preparing a thin film of already functionalized carbon powder (7), preferably nanometer-scale, on a glassy carbon electrode (3) as shown in FIG. 2. Prior approaches have typically used a thin layer of Nafion, a polymer membrane, to affix the carbon powder onto the surface of glassy carbon electrodes, carbon paper, and carbon cloth. However, in the disclosed method Nafion is not needed since a thin film of carbon powder is formed directly onto the glassy carbon electrode. A pH-buffered solution (5) containing a salt of the metal to be reduced is then produced. The carbon-coated electrode (3) is then immersed in the solution (5) containing a salt of the metal to be reduced. A three-electrode electrochemical cell (1) may be used to reduce the metal on the surface of the functionalized support by applying a first potential pulse to reduce the metal ions from solution and nucleate metal nanoparticles on the surfaces of the carbon support (7). The first potential pulse may be followed by a second potential pulse whose duration is used to control the final size of the nucleating nanoparticles. The electrochemical cell (1) used for nucleation and growth of nanoparticles typically has a counter electrode (2), a reference electrode (4), and an external power supply (6).

The first potential pulse is used to control the nucleation rate whereas the second potential pulse is used to drive subsequent growth of the nucleated nanoparticles. By using two separate potential pulses, both the nucleation density and the size of nanoparticles produced can be independently controlled by the duration of the pulses at the two potentials. Without being bound by any particular theory, it is believed that the nucleation density can also be controlled by the presence or absence of functional groups (8) on the surface of the support particles (7). Thus, a greater number of functional groups (8) on the surface of the support (7) will increase the nucleation density of nanoparticles during the first potential pulse, thereby impacting the growth mechanism of nanoparticles, e.g., anisotropic growth of nanowires and nanorods.

In one embodiment, the first potential may range from −0.5 V to −0.3 V while the second potential may range from −0.25 V to −0.1 V. In a preferred embodiment, in order to facilitate anisotropic growth of nanowires and nanorods on the surface of the functionalized support material, the first potential may range from −0.32 V to −0.3 V while the second potential may range from −0.22 V to −0.15 V; it is even more preferable to set the first potential to about −0.21 V while setting the second potential to about −0.2 V. All potential pulses are typically measured versus a Ag/AgCl (3 M NaCl) reference electrode, but may be determined using other reference electrodes provided in methods known in the Art.

When forming elongated nanoparticles on the functionalized carbon support from a solution containing noble metal ions, the pH of the solution is preferably less than 2. A suitable noble metal solution for producing Pd nanoparticles, nanowires, or nanorods may comprise, for example, 5 mM $PdCl_2$ and 0.1 M NaCl in water. However, the nanoparticles prepared by the disclosed method may also include nanoparticles made from such noble metals as Pt, Ir, Ru, Os, Au, or Re by immersion in a solution comprising one or more of $K_2PtCl_4$, $PdCl_2$, $IrCl_3$, $RuCl_3$, $OsCl_3$, $HAuCl_3$, or $ReCl_3$, respectively. Pulse potential deposition of Pd nanoparticles may then proceed by applying a first potential pulse in the range of −0.5 V to −0.3 V followed by a second potential pulse in the range of −0.25 V to −0.20 V. The pulse durations may be adjusted to attain the desired nucleation density and size distribution.

It is to be understood that the methods of forming the nanoparticles described above are merely exemplary. Any of a plurality of alternative electrodeposition methods which are well-known in the art and which are capable of forming nanoparticles with the desired shape, size, and composition may be employed. The key aspect is that the surface of the support material used for electrodeposition is functionalized to increase the nucleation density of nanoparticle growth. It is particularly preferred that the surface functionalization of the carbon-based support material be adjusted to maximize the nucleation of the growing nanoparticles.

Once nanoparticles having the desired shape, composition, and size distribution have been fabricated on the surface of the functionalized support material, an ultrathin shell layer may then be formed to generate a core/shell nanostructure by galvanic displacement. The particular process used to form the shell layer is not intended to be limited to any particular process, but is generally intended to be such that it permits formation of ultrathin films having thicknesses in the sub-monolayer-to-multilayer thickness range that can serve as core-shell nanoparticles for electrocatalytic applications.

In the exemplary embodiment, the process for forming a shell layer occurs by galvanic displacement when the nanoparticle cores are immersed into a solution comprising a salt of a more noble metal. Since the salt is more noble than the core material, an irreversible and spontaneous redox reaction in which core surface atoms are oxidized and replaced by the more noble ions contained in solution occurs. The final thickness and surface coverage of the resulting noble metal shell layer can be controlled by varying process parameters such as the concentration of the noble metal salt and the duration of the immersion in solution. For purposes of this specification, a process to generate core/shell nanoparticles is described in detail in PCT App. No. PCT/US2011/43901 filed on Jul. 13, 2011, which is incorporated herein by reference in its entirety.

In one exemplary embodiment, galvanic displacement is performed by immersing the nanoparticle cores in a solution comprising 0.05 mM to 5 mM $K_2PtCl_4$ to produce a Pt shell layer. In another exemplary embodiment a PdAu shell layer may be formed by immersing the particles cores in a solution comprising 0.5 mM $Pd(NH_3)_4Cl_2$ and 0.025 mM $HAuCl_3$. In two other exemplary embodiments Ru and Ir shell layers may be formed by immersing the nanoparticle cores in a solution comprising 1 mM $RuCl_3$ and $IrCl_3$, respectively. In the preferred embodiment, the nanoparticles cores are made from Pd and the nanoparticle shells are made from Pt. The duration of exposure in each of the above exemplary metal salts is set to obtain the desired thickness of the shell layer.

II. Energy Conversion Devices

In a preferred application, the nanoparticles as described above may be used directly or in a core/shell system as an electrode in an energy conversion device such as a fuel cell. The use of these nanoparticles advantageously provides a smooth surface that gives rise to an enhancement of the ORR activity and serves as an excellent core for monolayer Pt shell deposition. Use of these nanoparticles in a fuel cell is, however, merely exemplary and is being used to describe a possible implementation of the nanoparticles. Implementation as a fuel cell electrode is described, for example, in U.S. Pat. No. 7,691,780 to Adzic. It is to be understood that there are many possible applications for the nanoparticles which may include, but are not limited to, charge storage devices, applications which involve corrosive processes, as well as various other types of electrochemical or catalytic devices.

III. Example

Figure 3B:
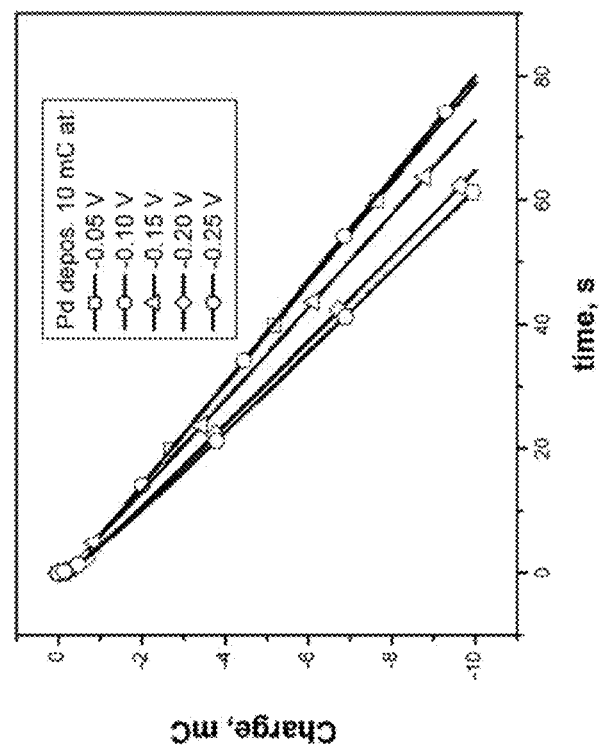
FIG. 3B is a plot showing the integrated charge associated with deposited Pd as a function of time.

An exemplary embodiment of the nanoparticles will be described in detail with reference to FIGS. 3-5. In this embodiment, carbon powder (~60 μg/cm² Vulcan® XC-72R) was initially dispersed in 15 ml $H_2O$ by sonication in an ice-mixed ultrasonic bath and oxidized by stirring in a concentrated nitric acid ($HNO_3$) for 1-20 hours at room temperature and atmospheric pressure, with about 3 hours being preferable. The produced functionalized carbon powder (which also may be referred to as an oxidized carbon powder) was washed with deionized water in order to remove the excess oxidizing agent, filtered using a Millipore® membrane filter, and dried at 60° C. overnight in a Fisher Laboratory dryer. The functionalized carbon powder was suspended in water to form a uniform slurry (~1 mg in 1 ml $H_2O$). An amount equal to 15 μl of this uniform slurry was transferred to a glassy carbon rotating disk electrode having a diameter of 0.5 cm.

Figure 3A:
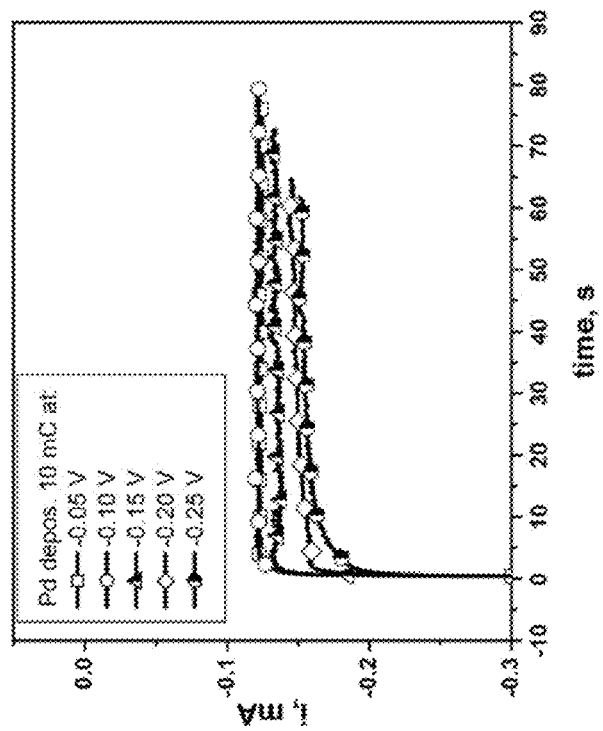
FIG. 3A is a plot showing current transients in response to an applied potential for Pd deposition on oxidized carbon nanoparticles as a function of time.

After drying in air, the carbon thin-film electrode was brought into an Argon (Ar)-saturated 5 mM $PdCl_2$ and 0.1 M NaCl solution. The Pd nanoparticles were generated by applying a single potential pulse at −0.5 V (vs. Ag/AgCl, 3 M NaCl) for 5 ms followed by a pulse at −0.21 V for 60 s. The Pd nanoparticles were produced up to 10 mC integrated charge that corresponds to about 28 μg/cm$^2$ of Pd. Within 5 minutes (~300 sec), the open-circuit potential rose to a stable value as shown in FIG. 3A. The integrated charge over the deposition time associated with deposited Pd was 10 mC.

Formation of a Pt shell layer was accomplished by transferring the rotating disk electrode into a deaerated $K_2PtCl_4$ solution in the same Ar-filled compartment. Pt ions in solution were reduced by metallic Cu via the reaction $Cu+Pt^{2+} \rightarrow Cu^{2+}+Pt$ with the amount controlled by the concentration of $K_2PtCl_4$ (0.1 mM to 1 mM) and the duration of galvanic replacement (3 to 30 minutes). After the electrode was immersed for a predetermined period of time, it was removed from solution and rotated in pure water to remove residual metal ions. Sample high resolution transmission electron microscopy (TEM) images of Pd—Pt core-shell particles produced after 5 minutes in a deaerated 1 mM $K_2PtCl_4$ solution are provided in FIGS. 4A-4B. The TEM images reveal that the higher intensity present around the edges of the nanoparticles reflects Pt deposition on the Pd core. The TEM images also show the presence of highly anisotropic growth of metal deposits on carbon nanoparticles that lead to the deposition of Pd nanowires.

The ORR activity and durability of the Pd/Pt core/shell nanoparticles were measured. The results are provided in FIG. 5 which shows ORR polarization curves for Pd solid nanoparticles with Pt shell prepared by the Cu displacement method. The durability of the Pd/Pt nanoparticles was tested with potential cycles swept between 0.6 V and 1.05 V at scan rate of 50 mVs$^{-1}$. No loss in surface area or ORR activity was observed for Pd/Pt nanoparticles after 30,000 cycles and in fact cycling resulted in a small increase in activity and a shift of the $E_{1/2}$ to >900 mV. Potential cycles pulsed between 0.65 V and 1.05 V with a 30-second dwell time at each limit were used. Stepping between two limiting potentials with long dwell time is considered to be a severe test of stability because the dissolution of low-coordinate sites is most rapid at 0.65 V and defects are most likely regenerated above 1 V. This mechanism is based on the reported highest dissolution rate of Pt(111) steps at 0.65 V, and the 0.6-nm deep holes observed over the whole surface area at 1.15 V. A very high activity of a Pt monolayer is achieved resulting in mass activity of 2.5 A/mg of Pt.

It will be appreciated by persons skilled in the art that the present nanoparticles are not limited to what has been particularly shown and described hereinabove. Rather, the scope of present nanoparticles is defined by the claims which follow. It should further be understood that the above description is only representative of illustrative examples of embodiments. For the reader's convenience, the above description has focused on a representative sample of possible embodiments, a sample that teaches the principles of the present invention. Other embodiments may result from a different combination of portions of different embodiments.

The description has not attempted to exhaustively enumerate all possible variations. That alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent. Furthermore, all references, publications, U.S. Patents, and U.S. Patent Application Publications cited throughout this specification are hereby incorporated by reference in their entireties as if fully set forth in this specification.

The invention claimed is:

1. A method of forming core-shell nanoparticles on carbon support, comprising:
   functionalizing a surface of the carbon support;
   producing elongated nanoparticles of a first noble metal on the surface of the functionalized carbon support by pulse potential deposition; and
   forming a shell layer of a second noble metal on an external surface of the nanoparticles to form core-shell nanoparticles.

2. The method of claim 1, wherein the core comprises Pd and the shell comprises Pt.

3. The method of claim 1, wherein the functionalized carbon support comprises carbon particles having high surface area per unit mass.

4. The method of claim 3, wherein the carbon particles comprise one or more functional groups on the surface of the carbon support selected from the group consisting of carboxylic, carbonyl, phenol, and lactone.

5. The method of claim 1 wherein producing the elongated nanoparticles of the first noble metal by pulse potential deposition comprises
   immersing the functionalized carbon support in a solution having a plurality of ions of the first noble metal;
   applying a first potential pulse to reduce the first noble metal and nucleate noble metal nanoparticles on surfaces of the functionalized carbon support; and
   applying a second potential pulse to anisotropically increase the size of the nucleated noble metal nanoparticles.

6. The method of claim 5, further comprising:
   forming a thin film of the functionalized carbon support on an electrode; and
   preparing a pH-buffered solution containing a salt of a first noble metal.

7. The method of claim 6, further comprising forming a shell layer of a second metal on an external surface of the elongated noble-metal nanoparticles by galvanic displacement to form core-shell nanoparticles.

8. The method of claim 7, wherein the shell layer is formed by transferring the nanoparticles to and immersing the nanoparticles in a solution comprising a salt of the second metal in the absence of oxygen.

9. The method of claim 7, wherein a salt of the second metal in a pH-buffered solution comprises 0.05 mM to 5 mM $K_2PtCl_4$.

10. The method of claim 7, wherein the process of forming a shell layer of a second metal on an external surface of the elongated noble-metal nanoparticles by galvanic displacement comprises depositing an atomic monolayer of Cu on the elongated nanoparticles of the first metal using underpotential deposition; and replacing Cu with the second metal using galvanic displacement.

11. The method of claim 5, wherein the functionalized carbon support comprises a plurality of nanometer-scale carbon particles having one or more functional groups on the surface of the carbon particles.

12. The method of claim 5, wherein the first potential is between −0.5 V and −0.3 V, the second potential is between −0.25 V and −0.20 V as measured against a Ag/AgCl (3 M NaCl) reference electrode, and the solution comprises about 0.1 M NaCl.

13. The method of claim 12, wherein the first potential is maintained for 5 ms and the second potential is maintained for 60 s.

14. The method of claim 5, wherein the salt of the first metal solution comprises 0.05 mM to 10 mM $PdCl_2$.

15. The method of claim 7, wherein the salt of the first metal solution comprises about 5 mM $PdCl_2$.

16. The method of claim 1, wherein the elongated nanoparticles are covalently bonded to the carbon support.

17. The method of claim 1, wherein the process of functionalizing the carbon support comprises exposing the carbon support to an oxidizing agent for 1-20 hours under ambient temperature and pressure.

18. The method of claim 17, wherein the process of functionalizing the carbon support comprises exposing the carbon support to an oxidizing agent for about 3 hours under ambient temperature and pressure.

19. The method of claim 17, wherein the oxidizing agent is selected from the group consisting of a nitric acid, a sulfuric acid, a perchloric acid, and a phosphoric acid.

20. The method of claim 1, wherein the first noble metal comprises Pd.

21. The method of claim 1, wherein the elongated nanoparticles have a morphology of a nanowire or a nanorod.

* * * * *

UNITED STATES PATENT AND TRADEMARK OFFICE
CERTIFICATE OF CORRECTION

PATENT NO.      : 9,099,253 B2
APPLICATION NO. : 13/624149
DATED           : August 4, 2015
INVENTOR(S)     : Radoslav Adzic, Stoyan Bliznakov and Miomir Vukmirovic It is certified that error appears in the above-identified patent and that said Letters Patent is hereby corrected as shown below:

Title Page, Item (72)

Change the Inventor's Name:

From -- Stoyan Blyznakov

To   -- Stoyan Bliznakov

Signed and Sealed this
Ninth Day of February, 2016

Michelle K. Lee
*Director of the United States Patent and Trademark Office*